(12) United States Patent
Rosene et al.

(10) Patent No.: US 7,603,727 B2
(45) Date of Patent: Oct. 20, 2009

(54) FLOATING SPA COVER OF ADJUSTABLE SIZE

(76) Inventors: Richard C. Rosene, 40034 Gibraltar Dr., Murrieta, CA (US) 92562; Lora J. Rosene, 40034 Gibraltar Dr., Murrieta, CA (US) 92562

( * ) Notice: Subject to any disclaimer, the term of this patent is extended or adjusted under 35 U.S.C. 154(b) by 0 days.

(21) Appl. No.: 11/400,268

(22) Filed: Apr. 7, 2006

(65) Prior Publication Data

US 2006/0180142 A1    Aug. 17, 2006

Related U.S. Application Data

(63) Continuation-in-part of application No. 10/875,933, filed on Jun. 24, 2004, now Pat. No. 7,093,593.

(51) Int. Cl.
*E04H 4/00* (2006.01)
(52) U.S. Cl. .................. 4/499; 4/498; 4/493; 4/494; 4/503; 126/561; 126/564; 126/565; 126/566
(58) Field of Classification Search ............... 126/566, 126/561, 564, 565; 4/493, 494, 498, 499, 4/503
See application file for complete search history.

(56) References Cited

U.S. PATENT DOCUMENTS

| | | | | | |
|---|---|---|---|---|---|
| 2,888,717 | A | * | 6/1959 | Domitrovic | 52/3 |
| 3,034,154 | A | * | 5/1962 | Silverstone | 441/38 |
| 3,072,920 | A | * | 1/1963 | Yellott | 126/566 |
| 3,600,721 | A | * | 8/1971 | Pusey | 4/499 |
| 3,608,099 | A | * | 9/1971 | Wall | 4/499 |
| 3,670,349 | A | * | 6/1972 | Moore | 441/125 |
| 3,798,690 | A | * | 3/1974 | Moore | 114/357 |
| 3,803,651 | A | * | 4/1974 | Moore | 441/81 |
| 3,940,809 | A | * | 3/1976 | Hughes | 4/499 |
| 4,000,527 | A | * | 1/1977 | Gannon | 4/499 |
| 4,022,187 | A | * | 5/1977 | Roberts | 126/565 |
| 4,028,750 | A | * | 6/1977 | Gustafsson | 4/498 |
| 4,146,015 | A | * | 3/1979 | Acker | 126/565 |
| 4,236,259 | A | * | 12/1980 | Wendt | 4/498 |
| 4,270,232 | A | * | 6/1981 | Ballew | 4/498 |
| 4,284,060 | A | * | 8/1981 | McCluskey | 126/565 |
| 4,332,048 | A | * | 6/1982 | Eddy | 441/1 |
| 4,366,806 | A | * | 1/1983 | Acker | 126/565 |
| 4,471,759 | A | * | 9/1984 | Anderson et al. | 126/626 |
| 4,601,072 | A | * | 7/1986 | Aine | 4/499 |
| 4,976,642 | A | * | 12/1990 | Wilkie | 441/131 |
| 5,095,557 | A | * | 3/1992 | Keyes | 4/503 |

(Continued)

*Primary Examiner*—Kenneth B Rinehart
*Assistant Examiner*—Jorge Pereiro
(74) *Attorney, Agent, or Firm*—Palomar Patent; Calif Tervo

(57) ABSTRACT

A floating spa cover generally comprises an inflatable insulating and soar heating central portion surrounded by one or more independently inflatable adjustable rings. The inflatable central portion comprises a center section and a peripheral ring. The center section covers most of the spa water surface and includes an upper film of substantially transparent plastic and a lower film of translucent plastic separated by a gas-filled space. The first adjustable ring, connected to the central portion so as to be selectively removable, encompasses the central portion and is independently inflatable to selectively adjust the area of the cover over a first range of areas. The second adjustable ring, connected to the first adjustable ring so as to be selectively removable, encompasses the first adjustable ring and is independently inflatable to selectively adjust the area of the cover over a second range of areas.

4 Claims, 2 Drawing Sheets

U.S. PATENT DOCUMENTS

| | | | |
|---|---|---|---|
| 5,144,704 A * | 9/1992 | Genzel et al. | 4/499 |
| 5,394,571 A * | 3/1995 | Vernon | 4/452 |
| 5,511,536 A * | 4/1996 | Bussey et al. | 126/565 |
| 5,667,416 A * | 9/1997 | Barth | 441/130 |
| 5,679,040 A * | 10/1997 | Bianchi-Holm | 441/129 |
| 5,779,512 A * | 7/1998 | Rupert | 441/123 |
| 6,076,201 A * | 6/2000 | Peterson | 4/506 |
| 6,185,765 B1 * | 2/2001 | High | 5/419 |
| 6,220,908 B1 * | 4/2001 | Peterson | 441/66 |
| 6,280,271 B1 * | 8/2001 | Peterson | 441/40 |
| 6,408,453 B1 * | 6/2002 | Song et al. | 4/506 |
| 6,539,559 B1 * | 4/2003 | Creech et al. | 4/507 |
| D579,570 S * | 10/2008 | Rosene et al. | D24/205 |
| D585,996 S * | 2/2009 | Rosene et al. | D24/205 |
| 2006/0195978 A1* | 9/2006 | Stout et al. | 4/498 |
| 2006/0283443 A1* | 12/2006 | Rosene et al. | 126/565 |
| 2007/0199142 A1* | 8/2007 | Gray | 4/498 |
| 2007/0271692 A1* | 11/2007 | Herd et al. | 4/499 |
| 2009/0056008 A1* | 3/2009 | Rosene et al. | 4/498 |

* cited by examiner

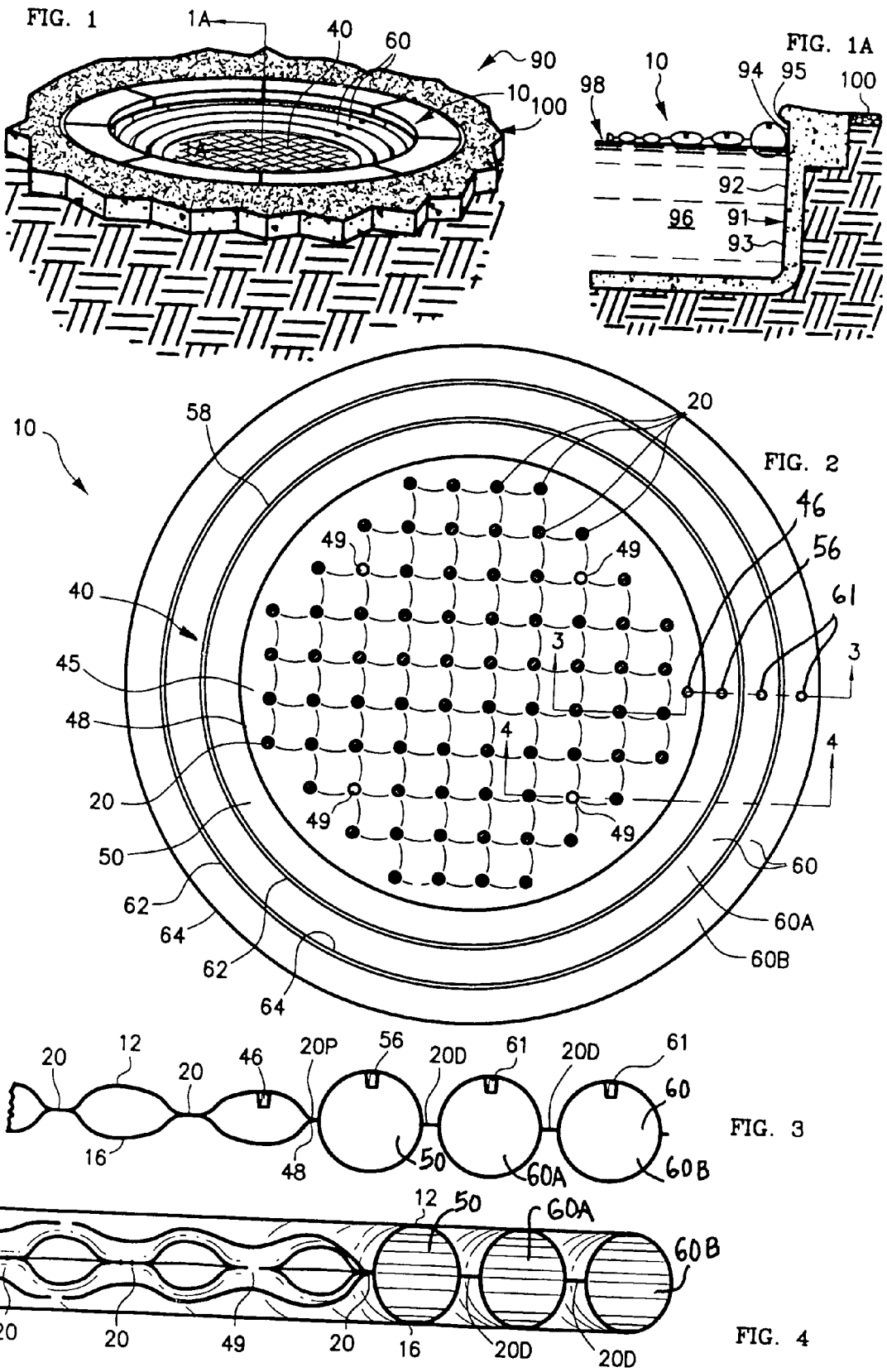

US 7,603,727 B2

FLOATING SPA COVER OF ADJUSTABLE SIZE

CROSS-REFERENCE TO RELATED APPLICATIONS

This application is a continuation-in-part of application Ser. No. 10/875,933, filed Jun. 24, 2004 now U.S. Pat. No. 7,093,593.

FIELD OF THE INVENTION

This invention relates in general to spa covers, and more particularly to a floating, insulating, and solar heating spa cover of adjustable size.

BACKGROUND OF THE INVENTION

Spa covers are used to cover and insulate the spa. The two major types of cover are the rigid cover and the floating cover. The rigid cover commonly is supported by the deck surrounding the spa. Rigid covers are typically about four to six inches thick and contain foam insulation. They are rather heavy and awkward to remove and replace and require a large storage space when off the spa.

There are two major types of conventional floating covers. Both types use a large thin sheet of material, typically about one-quarter inch thick, from which is cut a cover to fit the size of the particular spa. One type uses a sheet of closed-cell foam and the other type uses a bubble wrap sheet, such as used in packing.

Conventional floating covers of thin sheet material have several drawbacks. They often fold under when impacted by water jets of the spa resulting in not covering the entire area. They must be cut to size, which requires measurement. They do not readily provide for solar heating of the spa.

Therefore there has been a need for an improved floating spa cover that is inexpensive and readily adaptable to spas of different sizes.

It is additionally desirable that such a cover provide solar heating to the spa water.

SUMMARY OF THE INVENTION

This invention is an insulating and solar heating floating spa cover and it generally comprises a central portion surrounded by one or more independently inflatable adjustable rings.

In an exemplary embodiment the central portion covers most of the water surface and comprises a center section and a peripheral ring. The center section is inflatable and includes an upper film of substantially transparent plastic and a lower film of translucent, light-absorbing plastic connected to the upper film such that the films are substantially separated by a gas-filled space.

The first adjustable ring encompasses the central portion and is independently inflatable of said central portion such that, by adjusting the amount of inflation of the first adjustable ring, the area of the cover is selectively adjustable through a first range of areas. The first adjustable ring is connected to the central portion such that the first adjustable ring is selectively removable from the central portion.

The second adjustable ring encompasses the first adjustable ring an is inflatable independently of the first adjustable ring such that, by adjusting the amount of inflation of the second adjustable ring, the area of the cover is selectively adjustable through a second range of areas. The second adjustable ring is connected to the first adjustable ring such that the second ring is selectively removable from the first adjustable ring.

The first and second adjustable rings can be fully or partially inflated to accommodate different size spas.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 1 is a partial cross-sectional view and partial perspective view of an exemplary embodiment the spa cover of the invention floating on the water in a spa.

FIG. 1A is a partial cross-sectional view taken on line 1A of FIG. 1.

FIG. 2 is an enlarged top plan view of the spa cover of FIG. 1.

FIG. 3 is an enlarged cross-section of the cover taken on line 3-3 of FIG. 2.

FIG. 4 is an enlarged sectional view of the cover taken on line 4-4 of FIG. 2.

DETAILED DESCRIPTION OF THE INVENTION

Figure 5:
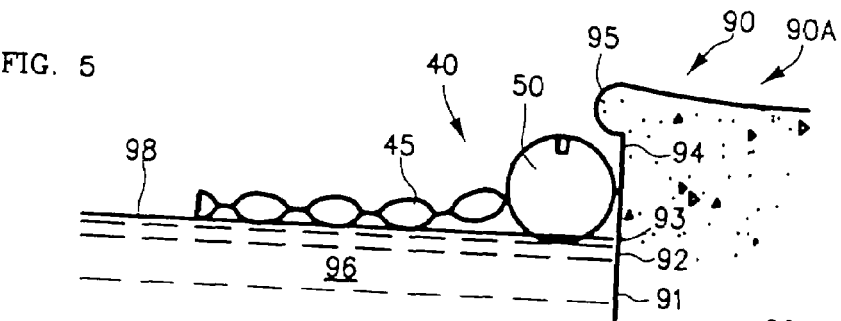
FIG. 5 is a side cross-section similar to FIG. 3, but showing only the central portion of cover configured by removing first and second adjustment rings in use in a small spa.

With reference now to the drawings, there is shown in FIG. 1 partial perspective view and in FIG. 1A a partial cross-sectional view taken on line 1A of FIG. 1 of an exemplary embodiment the insulating and heating spa cover 10 of the invention floating on the water 96 in a spa 90 sunken in a location, such as a patio or deck 100. Spa 90 generally comprises a receptacle 91 defined by walls 92, including side walls 93 for holding water 96 having a surface 98 having an area. Typically, side walls 93 have a top 95 that is above water surface 98 such that water surface 98 is surrounded by a splash wall 94. Cover 10 floats on surface 98 of water 96 and covers all or portion of surface 98.

Although the cover 10 of the invention is shown and described with respect to a spa 90 having a splash wall 94, cover 10 will function on a spill-over type spa wherein the water surface 98 is at the top 95 of side wall 93 and there is no splash wall 94. Also, although a circular spa 90 and cover 10 is shown and described, it will be seen that the teachings of the invention are applicable to spas 90 and covers 10 of other configurations, such as of rectangular, oval, or non-regular geometry.

Further including FIGS. 2-4, FIG. 2 is an enlarged top plan view of the spa cover 10 of FIG. 1, FIG. 3 is an enlarged cross-section of cover 10 taken on line 3-3 of FIG. 2, and FIG. 4 is an enlarged sectional view of cover 10 taken on line 4-4 of FIG. 2.

Cover 10 generally comprises a central portion 40 and one or more independently inflatable and removable surrounding adjustment rings 60, such as first adjustment ring 60A and second adjustment ring 60B. The principle of the invention is producing a spa cover 10 of one size, the maximum area of which is reducible by the user by only partially inflating one or more adjustment rings 60 or by removing one or more adjustment rings 60, so as to fit spas 10 of different sizes. The largest ring 50, 60 that can be fully inflated is fully inflated and any other, still remaining rings are partially inflated.

In the exemplary embodiment, cover 10 is constructed of an upper film 12, such as of plastic, such as of eight mil thick, ultra violet light resistant, polyvinylchloride, and a lower film 16, such as of plastic, such as of twelve mil thick, ultra violet light resistant polyvinylchloride. Films 12, 16 are bonded to one another to form the major structural components, that is, central portion 40 and adjustment rings 60. Preferably, upper film 12 is substantially transparent so as to let sunlight through. Preferably, lower film 16 is translucent such it absorbs some of the light received from upper film 12 and transmits some of the light for directly heating the water. A lower film 16 of blue tint has been found to proved the best heating of the water. The blue film is warmed by sunlight and transmits blue light into the water for heating the water. Upper film 12 and lower films 16 are substantially separated by a gas-filled space, filled such as with air.

Central portion 40 is buoyant and provides insulation for water 96 and solar heating of water 96. In the exemplary embodiment, central portion 40 includes a center section 45 and a peripheral ring 50. Center section 45 is of relatively large area, typically constituting far more than half of the area of central portion 40. In the large center section 45, means, such as a plurality of bonds 20, such as ultrasonic or heat and pressure bonds, periodically bond upper film 12 to lower film 16 such that the air space between them is limited in thickness, preferably to about three-quarters of an inch to one inch. Preferably, center section 45 is bonded about its periphery 48 so as to be air tight and is inflatable such as by means of air valve 46. Center section 45 includes passages 49 therethrough to allow air to escape up from beneath cover 10 and to allow for water to drain down through from atop cover 10. Center section 45 provides the majority of the solar heating to water 96.

Peripheral ring 50 is connected to center section 45, such as to periphery 48. Preferably, peripheral ring 50 is an inflatable toroid and is independently inflatable, such as by air valve 56. In the construction, shown, a narrow circular sealing bond 20P separates the air space of peripheral ring 50 from the gas filled space of center section 45. Peripheral ring 50 adds some stiffness to central portion 40, prevents central portion 40 from being swamped or folded under by water jet of spa 90 and makes central portion 40 easier to handle and manipulate.

First adjustment ring 60A has an inner periphery 62 and an outer periphery 64. First adjustment ring 60A is a hollow toroid that is inflatable, such as with valve 61, independently from central portion 40. First adjustment ring 60A is connected to central portion 40, such as by area of bond 20D on its inner periphery 62 to the periphery of central portion 40, such as to periphery 58 of peripheral ring 50 and encompasses central portion 40.

First adjustment ring 60A is inflatable independently of central portion 40 such that, by adjusting the degree of inflation of first adjustment ring 60A, the area of cover 10 is selectively adjustable through a first range of areas.

In the exemplary embodiment, each adjustment ring 60 is removable from the remainder of cover 10 by being connected to the remainder of the cover 10 by a bonded area 20D. In the bonded area, upper and lower films 12, 16 are bonded in a manner, such as by a wide bond or two separated ("double") bonds 20D as shown, which facilitate removal of an adjusting ring 60, such as by cutting the wide bond or by cutting between the double bonds 20D. Removal of first adjustment ring 60A allows adjustment of the area of cover 10 so as to be less than that of cover 10 incorporating first adjustment ring 60A.

Second adjustment ring 60B has an inner periphery 62 and an outer periphery 64. Second adjustment ring 60B is similar to first adjustment ring 60A in that it is a hollow toroid that is inflatable, such as with valve 61, independently from central portion 40. Second adjustment ring 60B is connected to first adjustment ring 60A, such as by area of bond 20D on its inner periphery 62 to the outer periphery 64 of first adjustment ring 60A, and encompasses first adjustment ring 60A.

Second adjustment ring 60B is inflatable independently of first adjustment ring 60A such that, by adjusting the degree of inflation of second adjustment ring 60B, the area of cover 10 is selectively adjustable through a second range of areas.

Second adjustment ring 60B is removable from the remainder of cover by being connected to the remainder of the cover 10 by a bonded area, such as double bonded area 20D. In the bonded area, upper and lower films 12, 16 are bonded in a manner, such as by a wide bond or two separated ("double") bonds 20D as shown, which facilitate removal of an adjusting ring, such as by cutting the wide bond or by cutting between the double bonds 20D. Removal of second adjustment ring 60B allows adjustment of the area of cover 10 to be less than that of cover 10 incorporating second adjustment ring 60B.

FIGS. 5-9 illustrate the functioning of cover 10. FIG. 5 is a side cross-section similar to FIG. 3, but showing only the central portion 40 of cover 10 configured by removing first and second adjustment rings 60A, 60B for use in a small spa 90A. Cover 10 floats on surface 98 of spa water 96, and peripheral ring 50 is adjacent splash wall 94 such that cover 10 substantially covers the entire water surface 98. Alternately, first and second adjustment rings 60A, 60B could remain attached but uninflated, such that they hang down.

Figure 6:
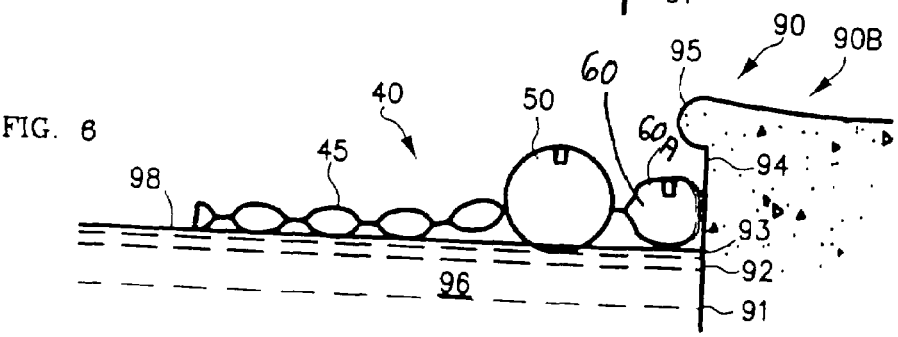
FIG. 6 is a side cross-section similar to FIG. 5, but showing the cover configured with one adjustment ring in use in a slightly larger spa.

FIG. 6 is a side cross-section similar to FIG. 5, but showing cover 10 in a slightly larger spa 90B with second adjustment ring 60B removed. Cover 10 is configured with first adjustment ring 60A partially inflated to fill the area between central portion 40 and splash wall 94 because cover 10 will not fit in spa 90B with first adjustment ring 60A fully inflated. Alternately, second adjustment ring 60B could remain attached, and uninflated, such that it hangs down.

Figure 7:
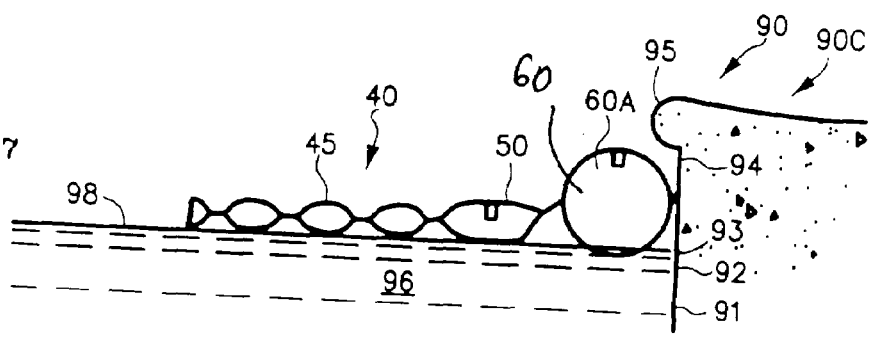
FIG. 7 is a side cross-section similar to FIG. 6, but showing the cover configured in use in a slightly larger spa.

FIG. 7 is a side cross-section similar to FIG. 6, but showing cover 10 configured for use in a slightly larger spa 90C with first adjustment ring 60A fully inflated and with peripheral ring 50 partially inflated. Peripheral ring 50 is inflated to approximately the thickness of center section 45 so as to provide insulation and proper sun gathering.

Figure 8:
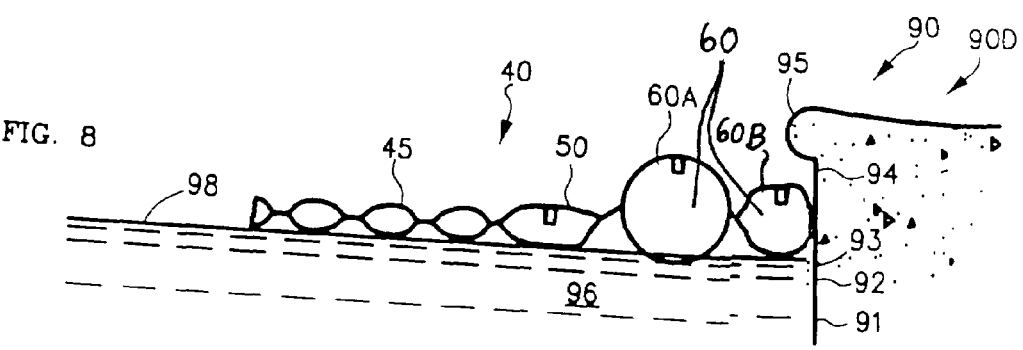
FIG. 8 is a side cross-section similar to FIG. 7, but showing the cover configured with two adjustment rings in use in a slightly larger spa.

FIG. 8 is a side cross-section similar to FIG. 7, but showing cover 10 configured with first and second adjustment rings 60A, 60B for use in slightly larger spa 90D. Peripheral ring 50 is still partially inflated. Second adjustment ring 60B is partially inflated to fill the area between first adjustment ring 60A and splash wall 94. Cover 10 will not fit in spa 90D with second adjustment ring 60B fully inflated.

Figure 9:
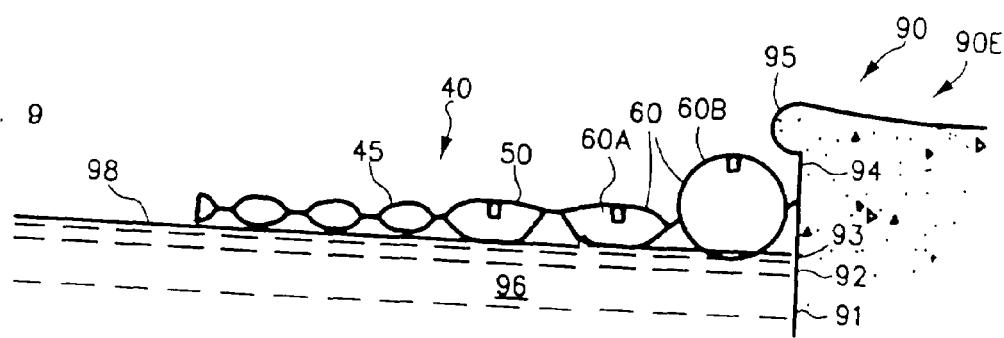
FIG. 9 is a side cross-section similar to FIG. 8 showing the cover configured in use in a slightly larger spa

FIG. 9 is a side cross-section similar to FIG. 8 showing cover 10 configured for use in slightly larger spa 90E. Second adjustment ring 60B is fully inflated and fits inside splash wall 94. Peripheral ring 50 and first adjustment ring 60A are partially inflated.

Having described the invention, it can be seen that it provides for a very efficient spa cover that is adaptable for spas of various sizes.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

We claim:

1. In combination:
   a spa including:
      a side wall; and
      water contained by said side wall; said water having a surface having an area; and
   an insulating cover for said spa; said insulating cover for floating on said surface of said water within said side wall; said insulating cover having an area for covering an area of said surface of said water; said insulating cover comprising:
      a buoyant central portion for covering a first portion of said surface of said water; said central portion having an outer periphery; and
      a first adjustment ring having an inner periphery; and an outer periphery; the inner periphery of said first adjustment ring being connected to said central portion and encompassing said central portion; said first adjustment ring being selectively inflatable independently of said central portion for covering a second portion of the area said surface of said water;
      a first connector connecting said first adjustment ring to said central portion such that said first adjustment ring is adjacent said central portion and is removable from said central portion; and
      a second adjustment ring having an inner periphery; and an outer periphery; the inner periphery of said second adjustment ring being connected to the outer periphery of said first adjustment ring and encompassing said first adjustment ring; said second adjustment ring being selectively inflatable independent of said central portion and said first adjustment ring for covering a third portion of the area of said surface of said water; and
      a second connector connecting said second adjustment ring to said first adjustment ring such that said second adjustment ring is adjacent said first adjustment ring and is removable from said first adjustment ring; such that, should said spa be smaller than the outer periphery of said second adjustment ring when fully inflated and bigger than the periphery of said first adjustment ring when fully inflated, then said second adjustment ring can be deflated, partially inflated or removed such that said cover fits said spa; and such that, should said spa be smaller than the outer periphery of said first adjustment ring when fully inflated and bigger than the periphery of said central portion, then said first adjustment ring can be deflated, partially inflated, or removed such that said cover fits said spa.

2. The combination of claim 1 wherein:
   said spa cover includes:
      passages therethrough to allow air to escape up from beneath said cover.

3. The combination of claim 1 wherein:
   said central portion includes:
      passages therethrough to allow air to escape up from beneath said cover.

4. The combination of claim 1 wherein:
   said central portion is inflatable and includes:
      a center portion including:
         an upper film of substantially transparent plastic;
         a lower film of translucent plastic connected to said upper film such that films are substantially separated by a gas-filled space; and
         passages therethrough to allow air to escape up from beneath said cover.

\* \* \* \* \*